United States Patent [19]

Wolynski et al.

[11] Patent Number: 4,490,761
[45] Date of Patent: Dec. 25, 1984

[54] CASETTE RECORDER CLEANING UNIT

[75] Inventors: Victor W. Wolynski, Orlando; James G. Horian; Robert L. Horian, both of Longwood, all of Fla.

[73] Assignee: Calibron Corporation, Lake Mary, Fla.

[21] Appl. No.: 404,392

[22] Filed: Aug. 2, 1982

[51] Int. Cl.³ .............................................. G11B 5/41
[52] U.S. Cl. ................................... 360/128; 360/137
[58] Field of Search ............................ 360/128, 137; 15/DIG. 12-14, 99-100, 256.5

[56] References Cited

U.S. PATENT DOCUMENTS

| 3,955,214 | 5/1976 | Post et al. | 360/128 |
| 4,141,053 | 2/1979 | Kara | 360/128 |
| 4,149,206 | 4/1979 | Loiselle | 360/128 |
| 4,387,411 | 6/1983 | Clausen | 360/128 |

OTHER PUBLICATIONS

Brochure—"1982 Award Winning High Fidelity Care Products", Allsop 3.
Brochure—NORTRONICS—Picture Perfect Guide to Home Video Recording.
Brochure—"Your Problem is in Your Head", by Headmaster.
Brochure—"discwasher—Video Head Cleaner".

Primary Examiner—A. J. Heinz
Attorney, Agent, or Firm—Barry E. Sammons

[57] ABSTRACT

A disposable bobbin for a cassette cleaner unit includes a filament spool which holds a cleaning filament that is prewetted with a cleaning fluid. The bobbin is packaged in an impermeable pouch which prevents evaporation of the cleaning fluid until its use in a video cassette player. The bobbin may be used in either Beta or VHS cassette cleaner units.

4 Claims, 5 Drawing Figures

CASSETTE RECORDER CLEANING UNIT

BACKGROUND OF THE INVENTION

The field of the invention is cleaning apparatus for magnetic tape recorders and playback units, and particularly, cleaning cassettes for video cassette players.

Cassette players include a series of rollers which drive and guide the magnetic tape along a path which includes one or more recording or playback heads. After extended use, the metal oxide material on the magnetic tape along with airborne contaminants build up a deposit on these rollers and heads which can interfere with both the record and playback process. These deposits can most effectively be removed with a cleaning solvent to restore the video and audio quality of the recording. Until recently, such cleaning was performed by authorized service centers which disassembled the equipment and manually cleaned each element in the tape path.

As d sclosed in U.S. Pat. Nos. 4,141,053, 3,955,214 and 4,149,206, it is well known to provide apparatus in the form of a cassette cleaner unit which may be inserted into audio cassette players. In audio cassette players there is a single standard configuration for the cassette and the tape path. In addition, the record and-/or playback head is readily accessible for cleaning and a single cassette cleaner unit with a mechanical apparatus for wiping the head will service all audio cassette players.

Video cassette players present a number of difficulties which precludes the use of cleaner units similar to those used on audio cassette players. First, there are two standard video cassette player units on the market; one is referred to herein as the "Beta" unit and the other is referred to herein as the "VHS" unit. Each of these units accepts a mechanically unique cassette and the tape path is totally different for each type. This requires two mechanically unique cassette cleaner units to service the entire market. Furthermore, the heads and rollers in the tape path of both VHS and Beta units are inaccessible for manual cleaning apparatus, and cleaning is accomplished by drawing a cleaning filament through the tape path where it engages and cleans all of the operable elements.

There are two cleaning techniques presently employed to clean video cassette players. In one, a dry filament material is drawn through the tape path, and in the other, the filament is saturated with a liquid cleaning agent before drawing it through the tape path. While the "wet" cleaning method can be very effective, the liquid cleaning agent must be applied to the filament by the user just prior to each cleaning.

SUMMARY OF THE INVENTION

The present invention relates to a cassette player cleaner which employs a cassette unit having a housing which is received by the cassette player and which houses a bobbin spool and an anchor spool which are driven by the cassette player, and a bobbin which contains a cleaning filament which has been pre-moistened with a predetermined amount of liquid cleaning agent. The bobbin is placed on the bobbin spool and the end of its filament is attached to the anchor spool. The cassette player is then operated to draw the pre-moistened filament through the tape path to clean the operating elements.

A general object of the invention is to provide an improved cassette player cleaner. The bobbin is separately packaged in a hermetic pouch which prevents the liquid cleaning agent from evaporating. The bobbin is removed from the pouch and is immediately placed in the cassette unit and drawn through the tape path. The liquid cleaning agent helps remove deposits from the operating elements of the cassette player and transfers the deposits to the filament which carries the deposited material away. This wet cleaning action continues until the liquid cleaning agent evaporates, and then a dry cleaning operation is performed by the remainder of the filament material. As a result, the advantages of both a wet and a dry cleaning process are achieved with the present invention.

Another object of the invention is to provide a cassette player cleaner having a disposable cleaning filament. By providing a bobbin spool in the cassette housing, the bobbin itself need only provide support for the filament material. The bobbin is thus simple in construction and can be manufactured at low cost. It is, therefore, possible to dispose of the bobbin and soiled filament after a single use and to thus insure that a clean filament is employed for each cleaning.

Another object of the invention is to provide a bobbin and cleaning filament which may be employed on both Beta and VHS cassette players. The structure of the bobbin is not only simple, but it also may be attached to the bobbin spool in either a Beta or VHS cassette housing. The physical peculiarities of each cassette player type are accommodated by the cassette housing thus enabling a single bobbin structure to be employed in each. In addition, the filament includes both a transparent window and a metal element which enables the end of the filament to be detected in either type of cassette player. The transparent window enables the photo detector on VHS players and the metal element enables the proximity detector on Beta players.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
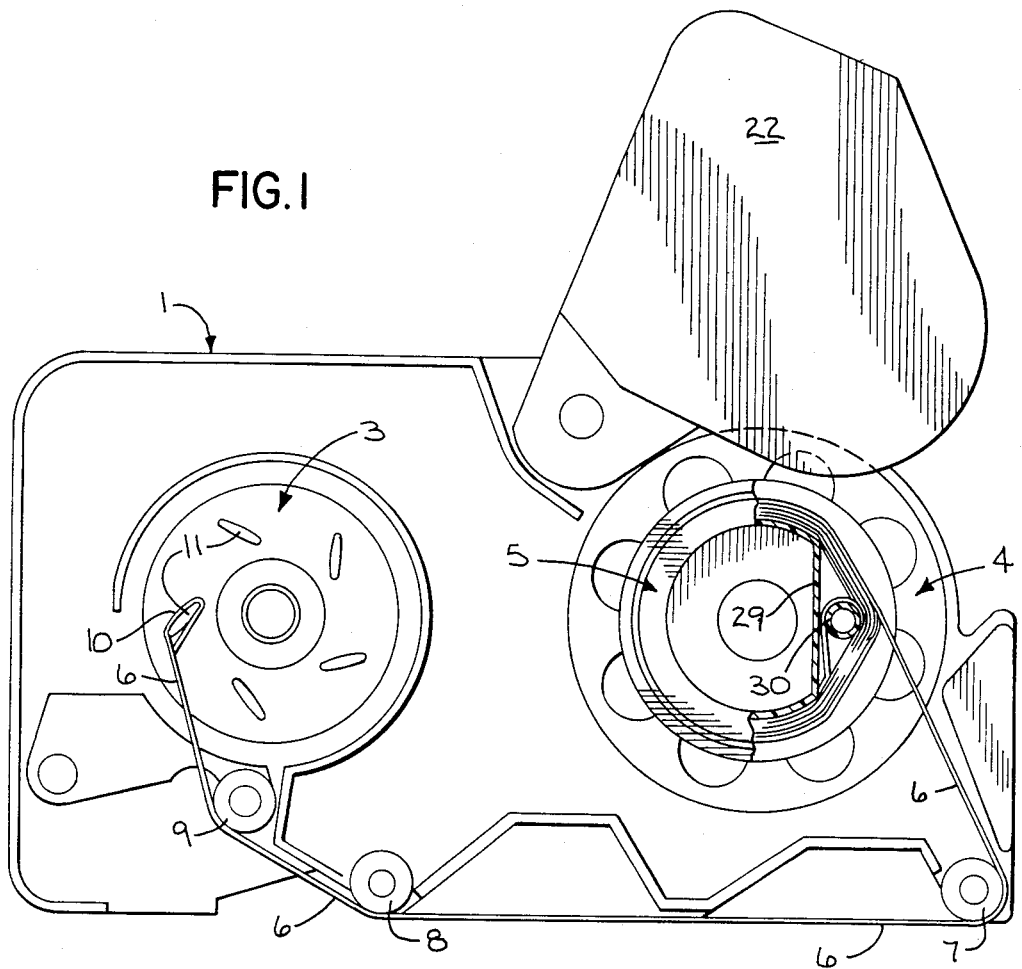
FIG. 1 is a top view with parts cut away of a cassette cleaner unit for a VHS cassette player.

Referring to FIG. 1, a cassette cleaner unit for use in VHS video cassette players includes a molded plastic housing 1. The shape and dimensions of the housing 1 are similar to the housings employed on VHS video tape cassettes, and the unit 1 may be inserted into a VHS cassette player in the usual manner.

Figure 2:
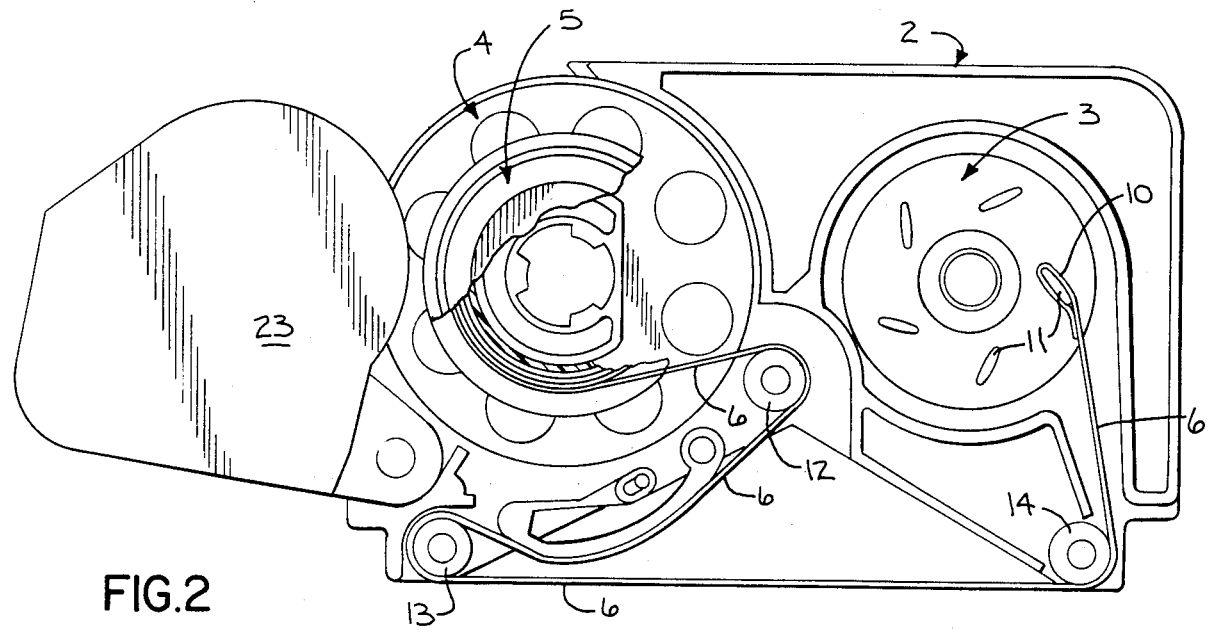
FIG. 2 is a top view with parts cut away of a cassette cleaner unit for a Beta cassette player.

Referring to FIG. 2, a cassette cleaner unit for use in Beta video cassette players includes a molded plastic housing 2. The shape and dimensions of the housing 2 are similar to the housings employed on Beta video tape cassettes, and the unit 2 may be inserted into a Beta cassette player in the usual manner.

Referring to FIGS. 1 and 2, both cassette cleaner units have many common components, but they are arranged in substantially different configurations. The housing 1 of the VHS cleaner unit supports an anchor spool 3 to the left of a bobbin spool 4, whereas on the Beta unit housing 2, the anchor spool 3 is to the right. In the VHS cleaner unit a hinged door 22 is swung open and a bobbin 5 containing a cleaning filament 6 is placed clockwise on the bobbin spool 4. The cleaning filament 6 is threaded through a path which includes rollers 7, 8 and 9. A loop 10 is formed on the end of the cleaning filament 6 and it is attached to an anchor fin 11 on the anchor spool 3. In contrast, on the Beta cleaner unit a door 23 is swung open and the bobbin 5 is inserted counterclockwise. The filament 6 is pulled from the bobbin 5 through a path which includes rollers 12, 13 and 14. The loop 10 on its end attaches to a fin 11 on the anchor spool 3.

Figure 5:
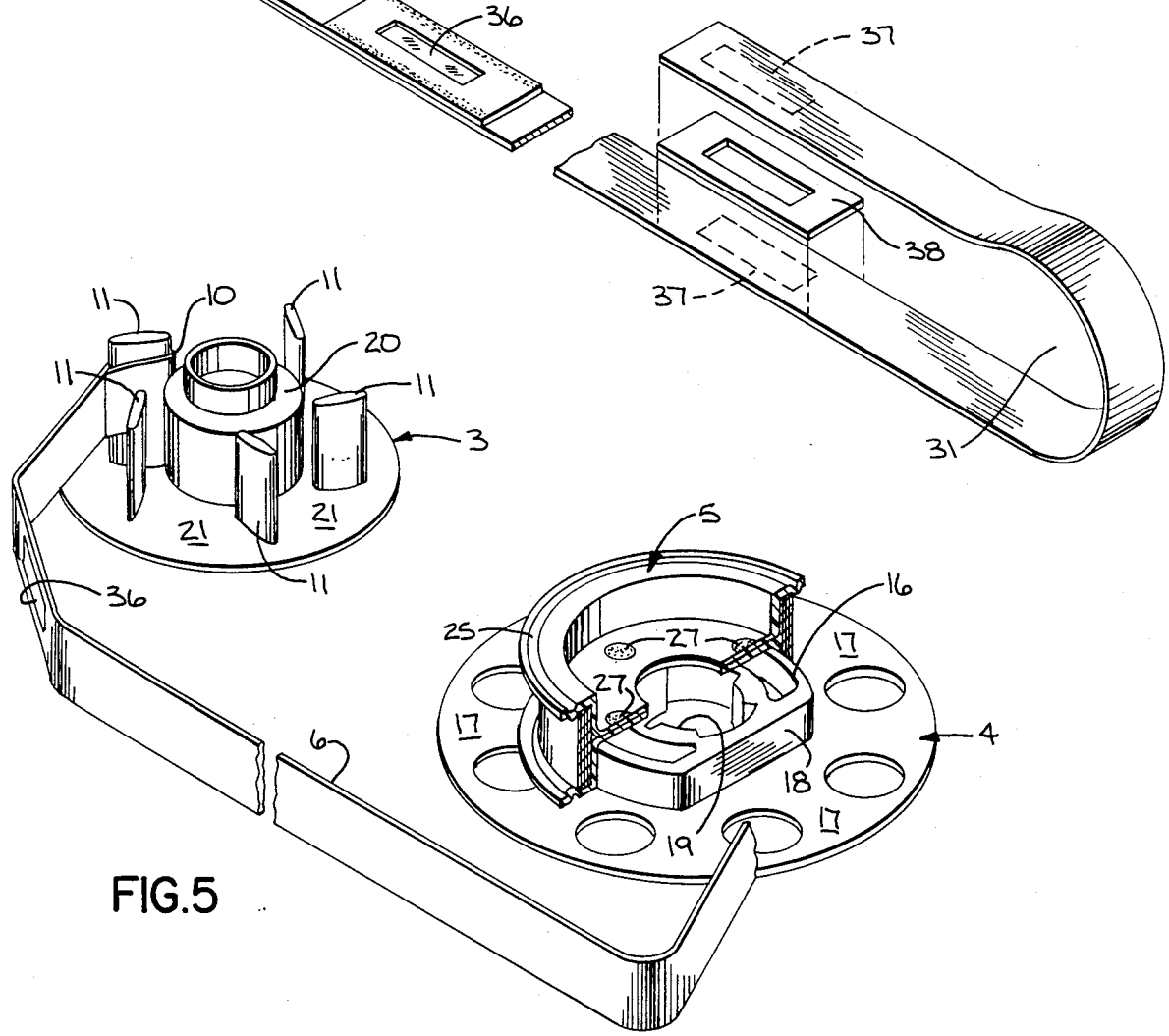
FIG. 5 is a partial perspective view with parts cut away of a bobbin mounted in place.

Although there are significant differences between the Beta and VHS cleaner units, a single bobbin 5 may be used in either unit. This is accomplished in part by the use of the same bobbin spool 4 and anchor spool 3 in both cleaner units. Referring particularly to FIG. 5, the bobbin spool 4 is molded as a single piece and includes a raised hub portion 16 and a surrounding flange portion 17. The hub 16 is substantially circular in shape but is truncated on one side to form a key 18. A central opening 19 in the hub 16 receives the drive shaft (not shown in the drawings) of the cassette player which revolves the bobbin spool 4 within the housing 1 or 2.

Referring still to FIG. 5, the anchor spool 3 is similarly molded as a single piece and it includes a central hub 20 which is also rotated by the cassette player unit. A circular flange 21 extends outward from the central hub 20 and five anchor fins 11 extend upward from the flange 21 around the entire circumference of the anchor spool 3. The bobbin spool 4 and anchor spool 3 provide an interface between the drive mechanism on either on VHS or a Beta cassette player unit and the bobbin 5.

Figure 3:
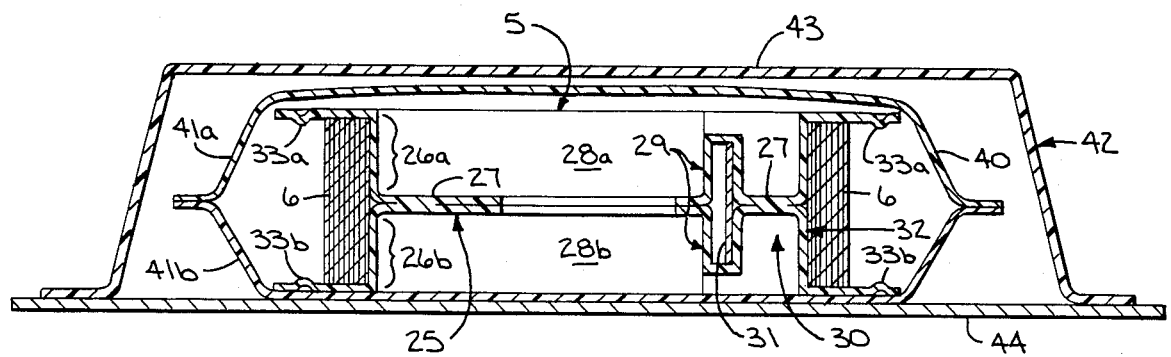
FIG. 3 is a view in cross section of a packaged bobbin for use in the cassette cleaner units of FIGS. 1 and 2.

As shown best in FIGS. 3 and 5, the bobbin 5 is comprised of a filament spool 25 and the filament 6. The filament spool 25 is formed from two identically thermoformed parts 26a and 26b which are sonically welded together at points 27 to provide a symmetrical structure having a pair of spaced retainer flanges 33a and 33b which extend radially outward from a hub 32 that defines identical central coupling cavities 28a and 28b. The coupling cavity 28b receives the hug 16 of the bobbin spool 4 when the bobbin 5 is used on a VHS cleaner unit, and the flip side coupling cavity 28a engages the hub 16 when the bobbin 5 is employed in a Beta cleaner unit. As shown best in FIGS. 1 and 3, the coupling cavities 28a and 28b are truncated by a wall 29 which not only provides a flat surface that mates with the key 18 on the hub 16, but which also provides space for a pin 30 that anchors one end of the filament 6. A loop 31 is formed on the end of the filament 6 and is locked in place around the pin 30 when the two spool halves 26a and 26b are sonically welded together.

Figure 4:
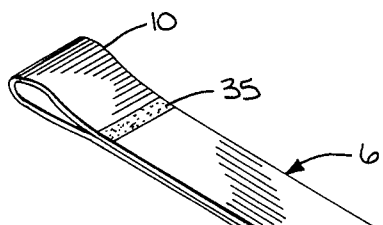
FIG. 4 is a perspective view of a filament which forms part of the bobbin of FIG. 3.

Referring particularly to FIG. 4, the filament 6 is constructed from a length of spunbonded polyolefin material. The loop 10 is formed in one of its ends by sonically welding at a strip 35 and the loop 31 is formed at its other end in identical fashion. When forming the loops 10 and 31, however, terminating window 36 and 37 are also formed at each end of the filament. The window 36 is formed by sonically welding a portion of the looped material to provide a transparent area in the polyolefin material. The window 37 is formed in a similar manner at the other end of the filament, however, a thin sheet of aluminum 38 is trapped between the welded layers of filament material. An opening 39 in the aluminum sheet 38 allows the sonic weld to be made which forms the window 37. Transparent windows 36 and 37 are thus formed on each end of the filament 6 to activate light sensitive end-of-tape sensors on VHS cassette players, and the aluminum sheet 38 operates to activate the proximity detector employed to detect end of tape in Beta cassette players.

The cleaning filament 6 is a strong, lint-free, nonabrasive, absorbent material which carries a liquid cleaning agent. The cleaning filament 6 is approximately 72 inches long and it has an area of thirty-six square inches. Approximately two cubic centimeters of liquid cleaning agent is carried by the filament 6; and it is comprised of 65% fluorocarbon vehicle and 35% isopropanol alcohol. The preferred cleaning agent is sold by Allied under the trademark "Genesolv DI-35". This liquid cleaning agent is highly volatile, and when the filament 6 is in use, it provides approximately ten seconds of wet cleaning action before it drys. The absorbent filament material carries away foreign materials which are loosened from the cassette player operating elements by the liquid cleaning agent, and it continues to perform a dry cleaning function even after the liquid cleaning agent has evaporated.

Referring particularly to FIG. 3, the bobbin 5 is packaged in a hermetic pouch 40 which is formed from two sheets 41a and 41b of an impermeable packaging material. The two sheets 41a and 41b are heat sealed together around their perimeter to form the pouch 40 with the bobbin 5 inside. Although a number of packaging materials may be used for the pouch 40, it is important that the material not contain plasticizers or release agents which may be absorbed by the fluorocarbon vehicle and left as a residue on the operating elements of the cassette player unit being cleaned. Packaging materials made of nylon, saran, mylar or polyvinyl alcohol may be employed, but a 1.5 mil thick nylon material sold under the trademark "Nylon 6" by DuPont is preferred.

The pouch 40 containing the bobbin 5 is housed in a package 42 which is suitable for transport and retail display. The package 42 includes a clear plastic cover 43 and a rigid cardstock backing 44. The backing 44 provides a surface for written information.

Referring particularly to FIGS. 1, 2 and 3, the bobbin 5 is prewetted with the proper amount of liquid cleaning agent and is used only once to clean either a Beta or VHS cassette player. The pouch 40 is removed from the package 42 and is opened to gain access to the bobbin 5. The door 22 or 23 is opened on the respective cassette cleaner unit 1 or 2 and the bobbin 5 is placed on the hub 16 of the bobbin spool 4. The door 22 or 23 is then closed and the cleaning filament 6 is threaded as shown in FIGS. 1 and 2, and the loop 10 on the end of the cleaning filament is attached to the anchor spool 3. The cassette cleaner unit 1 or 2 is inserted into the cassette player (not shown in the drawings) and the cassette player is operated to rotate the bobbin spool 4 and anchor spool 3 and to thereby move the cleaning filament 6 across the surfaces of the various cassette player operating elements. When the cleaning filament 6 has been pulled through the tape path, the filament 6 is rewound on the filament spool 25 and the cassette cleaner unit 1 or 2 is removed from the cassette player. The door 22 or 23 is then opened and the bobbin 5 is removed and disposed.

We claim:

1. A replaceable bobbin for a cassette cleaner unit used for the purpose of cleaning a record and/or playback device, the combination comprising:

a filament spool having a central hub with a pair of spaced retainer flanges which extend radially outward from the respective ends of the hub, and having coupling means on each end of the hub for engaging a bobbin spool in the cassette cleaner unit, a cleaning filament having one end attached to the filament spool and being wound around the hub and disposed between the flanges, said cleaning filament being moistened with a liquid cleaning agent to improve the cleaning action of the filament, and said spool and moistened filament being sealed in packaging material which prevents evaporation of the liquid cleaning agent prior to distribution to the end user for installation in the cassette cleaner unit.

2. The replaceable bobbin as recited in claim 1 in which a measured amount of liquid cleaning agent is disposed on the cleaning filament, and an impermeable package material surrounds the filament spool and cleaning filament to prevent evaporation of the liquid cleaning agent, wherein the amount of liquid cleaning agent is selected such that upon removal of the impermeable package material and use of the replaceable bobbin in a cassette cleaner unit, the liquid cleaning agent has substantially evaporated before the cleaning filament has been totally processed through the equipment to be cleaned.

3. The replaceable bobbin as recited in claim 1 in which the liquid cleaning agent includes alcohol.

4. The replaceable bobbin as recited in claim 1 in which the liquid cleaning agent includes a fluorocarbon material and the impermeable package material is made of nylon.

* * * * *